(12) United States Patent
Wang et al.

(10) Patent No.: US 11,003,269 B2
(45) Date of Patent: May 11, 2021

(54) TOUCH PANELS AND TOUCH DISPLAY DEVICES

(71) Applicant: Yungu (Gu'an) Technology Co., Ltd., Langfang (CN)

(72) Inventors: Bing Wang, Kunshan (CN); Tianchao Zhang, Kunshan (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/533,987

(22) Filed: Aug. 7, 2019

(65) Prior Publication Data

US 2019/0361556 A1 Nov. 28, 2019

Related U.S. Application Data

(63) Continuation of application No. PCT/CN2018/089971, filed on Jun. 5, 2018.

(30) Foreign Application Priority Data

Nov. 30, 2017 (CN) .......................... 201721643603.9

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 2203/04102* (2013.01)

(58) Field of Classification Search
None
See application file for complete search history.

(56) References Cited

U.S. PATENT DOCUMENTS

| | | | | |
|---|---|---|---|---|
| 2011/0148780 A1* | 6/2011 | Lu | .......................... | H05K 3/061 345/173 |
| 2014/0204283 A1* | 7/2014 | Huh | ...................... | G06F 3/0443 349/12 |
| 2015/0277627 A1* | 10/2015 | Pang | ...................... | G06F 3/0446 345/174 |
| 2015/0293634 A1 | 10/2015 | Her et al. | | |
| 2017/0139525 A1* | 5/2017 | Jo | ........................... | G06F 3/046 |

FOREIGN PATENT DOCUMENTS

| | | |
|---|---|---|
| CN | 102253776 A | 11/2011 |
| CN | 104216595 A | 12/2014 |
| CN | 104951121 A | 9/2015 |

OTHER PUBLICATIONS

International Search Report with English translation and Written Opinion dated Sep. 7, 2018 in corresponding International Application No. PCT/CN2018/089971; 7 pages.

* cited by examiner

*Primary Examiner* — Carl Adams
(74) *Attorney, Agent, or Firm* — Maier & Maier, PLLC

(57) ABSTRACT

A touch panel includes a plurality of first touch electrode patterns including a plurality of first touch units and a connection unit connecting two adjacent first touch units. The touch panel further includes a plurality of second touch electrode patterns insulated from and intersected with the first touch electrode patterns, and the second touch electrode patterns includes a plurality of second touch units and a bridge unit connecting two adjacent second touch units, and a plurality of bridge units are arranged along a preset direction and an intersection angle between the preset direction and the second direction is greater than 0° and less than 90°.

20 Claims, 5 Drawing Sheets

TOUCH PANELS AND TOUCH DISPLAY DEVICES

CROSS-REFERENCE TO RELATED APPLICATIONS

This application is a continuation of International Application No. PCT/CN2018/089971, filed on Jun. 5, 2018, which claims priority to Chinese Patent Application No. 201721643603.9, entitled "TOUCH PANELS AND TOUCH DISPLAY DEVICES" filed on Nov. 30, 2017, the contents of which are expressly incorporated by reference herein in their entireties.

FIELD

The disclosure relates to the field of touch technology.

BACKGROUND

In the prior art, a flexible screen is often used in wearable devices due to low power consumption and bendability. In order to satisfy an interaction between a user and the flexible screen, a touch panel is usually arranged by overlapping on the flexible display screen in order to receive touch operation instructions such as clicking and sliding on the touch screen.

The existing touch panel often has a first direction electrode 11 and a second direction electrode 12. As shown in FIG. 1a, wherein the enlarged view of the specific structure is shown in FIG. 1b, the first direction and the second direction are perpendicular to each other. The first direction electrode 11 is continuously arranged, and the second direction electrode 12 is arranged at intervals, and a bridge unit 13 is arranged between the adjacent electrodes 121 of the second direction electrode 12 to make the second direction electrode 12 be connected to each other and be insulated from the first direction electrode 11. In the actual application process, an electronic device often has a habitual bending direction, such as vertical bending or horizontal bending. Under the action of external forces, the touch panel tends to bend accordingly. When bending, the bridge unit 13 is subjected to bending stress.

SUMMARY

Touch panels and touch display devices are provided for improving the problem of touch failure caused by the easy breakage of the bridge unit when the touch panel bends in the prior art.

Exemplary embodiments of the disclosure adopt the following technical schemes:

A display panel comprising:
a plurality of first touch electrode patterns arranged along a first direction, the first touch electrode patterns comprising a plurality of first touch units and a connection unit connecting two adjacent first touch units;
a plurality of second touch electrode patterns arranged along a second direction and insulated from and intersected with the first touch electrode patterns, the second touch electrode patterns comprising a plurality of independent second touch units and at least one bridge unit connecting two adjacent second touch units, the at least one bridge unit being arranged along a preset direction, and an intersection angle between the preset direction and the second direction being greater than 0° and less than 90°.

Preferably, the at least one bridge unit comprises only one or more metal bridges.

Preferably, the at least one bridge unit comprises at least two metal bridges and a connection portion connecting the at least two metal bridges, and the at least two metal bridges are arranged along the preset direction.

Preferably, in the at least two metal bridges, each metal bridge is arranged along different preset directions.

Preferably, each bridge unit comprises four metal bridges, and two metal bridges are arranged at one side of the connection portion and the other two metal bridges are arranged at the other side of the connection portion.

Preferably, the metal bridges located at both sides of the connection portion are centro-symmetrically arranged.

Preferably, the first touch electrode pattern is provided with a hollow-out region, the connection portion is insulatively embedded in the hollow-out region.

Preferably, the connection portion is insulated from and overlapped with the first touch electrode pattern.

Preferably, the two adjacent second touch units corresponding to any one of the bridge units have a concave-convex structure at a spaced channel between the two adjacent second touch units, respectively, and the two second touch units are connected by the bridge unit via the shortest distance.

Preferably, the connection unit of the first touch electrode pattern has a concave-convex structure matching with the concave-convex structure of the second touch electrode pattern.

A touch display device comprises a display panel and any one of the above touch panels.

The following beneficial effects can be achieved by at least one of the above technical scheme adopted by the exemplary embodiments of the disclosure:

In the technical scheme provided by the disclosure, the bridge unit is obliquely arranged along the preset direction between the second touch units which are spaced apart from each other along the second direction, and the bending line can be effectively extended when the touch panel bends under the stress, so that stress can be dispersed and released to the surroundings, reducing the occurrence of breakage after the bridge unit bends under the stress. In addition, in the scheme, the adjacent two second touch units are also connected by the connection portion and the metal bridge, and the connection portion can effectively shorten the length of the metal bridge, thereby alleviating reflecting light of metals. Moreover, in the present scheme, the connection portion is insulated from the first touch electrode pattern so that the first touch electrode pattern and the second touch electrode pattern are turned on, respectively, and signal crosstalk or short circuit is avoided.

BRIEF DESCRIPTION OF THE DRAWINGS

The drawings described herein are provided for further understanding the disclosure and as a part of the disclosure. The exemplary embodiments of the disclosure and description thereof are used to explain the disclosure and not as any improper limitation to the disclosure. In the drawings.

DETAILED DESCRIPTION

Technical schemes provided by exemplary embodiments of the disclosure will be described in details below in conjunction with the drawings.

Exemplary Embodiment 1

The exemplary embodiment provides a touch panel for improving the problem of touch failure caused by the easy breakage of the bridge unit when the touch panel bends in the prior art. The specific structure refers to FIG. 2a, the touch panel includes:
a plurality of first touch electrode patterns arranged along a first direction. Each first touch electrode pattern comprises a plurality of first touch units 21 and a connection unit for connecting two adjacent first touch units 21;
a plurality of second touch electrode patterns arranged along a second direction and insulated from and intersected with the first touch electrode patterns. Each second touch electrode pattern comprises a plurality of independent second touch units 22 and at least one bridge unit 23 for connecting two adjacent second touch units 22. The at least one bridge unit 23 is arranged along a preset direction. And an intersection angle between the preset direction and the second direction is greater than 0° and less than 90°.

Figure 1A:
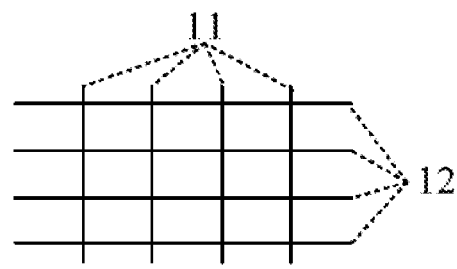
FIG. 1a is a schematic structural view of a touch panel in the prior art.
Figure 1B:
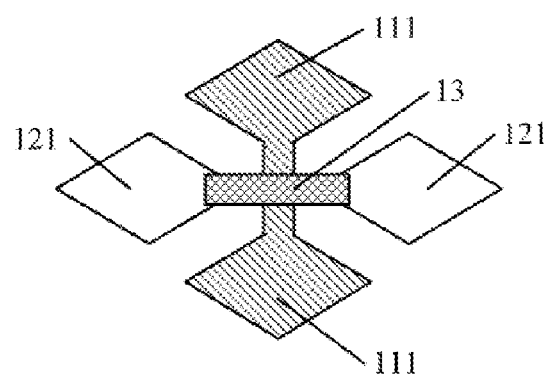
FIG. 1b is an enlarged structural view of a touch panel in the prior art.
Figure 2A:
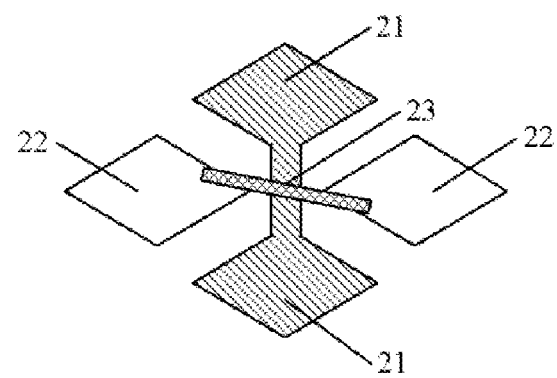
FIG. 2a is a first schematic structural view of a touch panel provided by the present scheme.
Figure 2B:
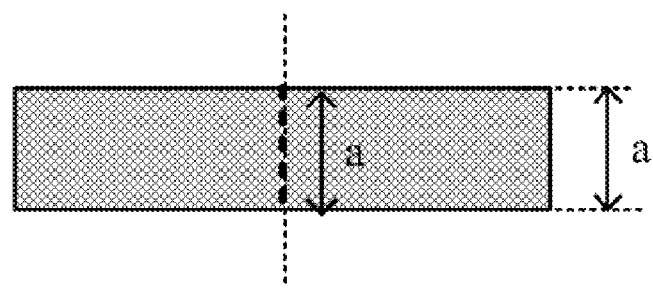
FIG. 2b is a partial enlarged view of a bridge unit in the prior art.
Figure 2C:
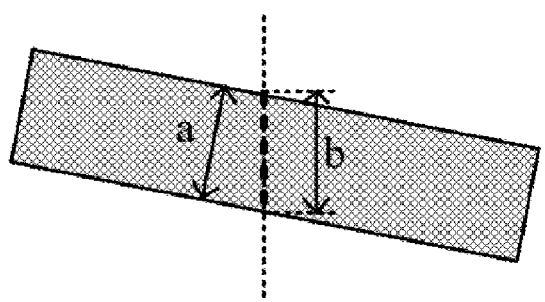
FIG. 2c is a partial enlarged view of a bridge unit of the present scheme.

The touch panel bends and deforms correspondingly when subjected to an external force. For the existing touch panel structure, a partial enlarged view of the bridge unit 23 is shown in FIG. 2b. If the touch panel bends along the broken line when subjected to the external force, and a bending line of the bridge unit 23 is shown by a thick line in the drawing. Moreover, a width of the bridge unit 23 is a. For the existing structure, a length of the bending line for dispersing stress on the bridge unit 23 when bending is a, which is the same as the width of the bridge unit 23, that is, bending stress can be dispersed on the bending line.

For the touch panel structure provided by the present scheme, if the bridge unit bends along the broken line, the bending line of the bridge unit 23 is shown by a broken line in the drawing. Moreover, the width of the bridge unit 23 is a, and the length of the bending line for dispersing stress on the bridge unit 23 when bending is b, and as can be seen from the drawing, b is larger than a, and the bending stress can be dispersed on the length b. That is to say, for the same bridge unit 23 bending at the same position, compared with the prior art, the present scheme has a longer bending line for dispersing the stress, that is, the stress can be more uniformly dispersed. The bending stress is uniformly dispersed at various positions of the bridge unit 23 and does not concentrate on the bending line totally. For the same magnitude of bending force, the stress can be more uniformly dispersed using the structure of the present scheme so that every position of the bridge unit 23 located on the bending line is subjected to less stress, thereby reducing the breakage of the bridge unit 23 when subjected to the bending stress, ensuring the normal touch signal transmission by the touch panel, and enhancing the durability of the touch panel.

In the technical scheme provided by the disclosure, a bridge unit 23 is obliquely arranged along a preset direction between the second touch units 22 which are spaced apart from each other along the second direction. When the touch panel bends under the stress, the bending line can be effectively extended, so that the stress can be dispersed and released to the surroundings, thereby reducing the probability of the breakage of the bridge unit 23 at the bending line after bending under the stress.

Exemplary Embodiment 2

Based on the above exemplary embodiment, the exemplary embodiment further provides a touch panel. With reference to FIG. 2a, in the panel, the at least one bridge unit 23 includes only a metal bridge that is obliquely arranged along the preset direction. Taking one bridge unit 23 for example, the bridge unit 23 includes only the metal bridge, and the adjacent two second touch units 22 can be connected to each other through the metal bridge, thereby ensuring good touch performance of the touch panel. Moreover, the metal bridge is arranged along the preset direction in the present scheme, and for the common flexible electronic device, a user generally has a habitual bending direction, such as horizontal bending or vertical bending. The metal bridge arranged along the preset direction can effectively increase the bending line when bending, thereby expanding a range for dispersing stress, better dispersing the stress, reducing the breakage of a metal wire when bending under the stress, and enhancing the durability of the touch panel.

Figure 3:
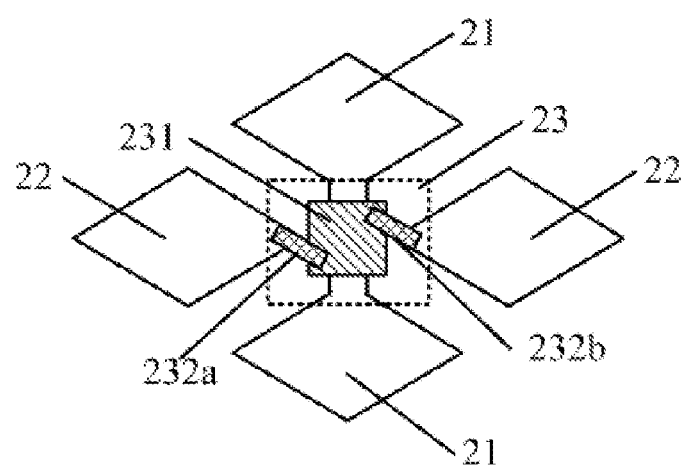
FIG. 3 is a second schematic structural view of a touch panel provided by the present scheme.

Based on the above exemplary embodiment, the present scheme further provides a preferred scheme. The at least one bridge unit 23 includes at least two metal bridges 232a, 232b, the specific structure of which is shown in FIG. 3, and a connection portion 231 for connecting the at least two metal bridges 232a, 232b. The at least two metal bridges 232a, 232b are arranged along the preset direction.

In the touch panel provided by the present scheme, the two adjacent second touch units 22 are connected via the connection portion 231 and the metal bridges 232a and 232b. The structure can effectively shorten the length of the metal bridge between the two second touch units 22. Adopting the above structure between every two adjacent second touch units 22 on the touch panel can alleviate reflecting light phenomenon of the metals in the touch panel. In addition, the metal bridge is arranged along the preset direction in the present scheme, and for the common flexible electronic device, a user generally has a habitual bending direction, such as horizontal bending or vertical bending. The metal bridge arranged along the preset direction can effectively increase the bending line when bending, thereby expanding a range for dispersing stress, better dispersing the stress, reducing the breakage of a metal wire when bending under the stress, and enhancing the durability of the touch panel.

Figure 4:
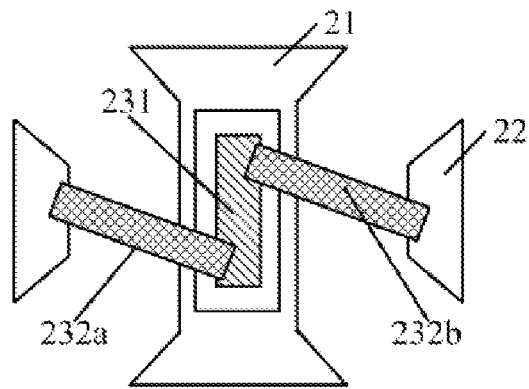
FIG. 4 is a third schematic structural view of a touch panel provided by the present scheme.

In addition, based on the above structure, the present scheme further provides a touch panel, and a partial enlarged view of the connection portion is shown in FIG. 4, and the connection portion 231 is insulatively embedded in a hollow-out region of the first touch electrode pattern.

The connection portion 231 is located in the hollow-out region of the first touch electrode pattern, and is spaced apart from the first touch electrode pattern, and the metal bridges 232a and 232b may be arranged between the connection portion 231 and the second touch units 22, and the number of the metal bridges can be two or more. The plurality of metal bridges can be arranged in the same direction or in different directions. In this configuration, the adjacent two second touch units 22 can be turned on by the connection portion 231 and the metal bridges, which not only ensures the touch performance of the touch panel, but also effectively extends the bending line when the touch panel is subjected to the force, so that the stress can be dispersed and released to the surroundings, thereby reducing the occurrence of breakage after the bridge unit 23 bends under the stress.

Figure 5A:
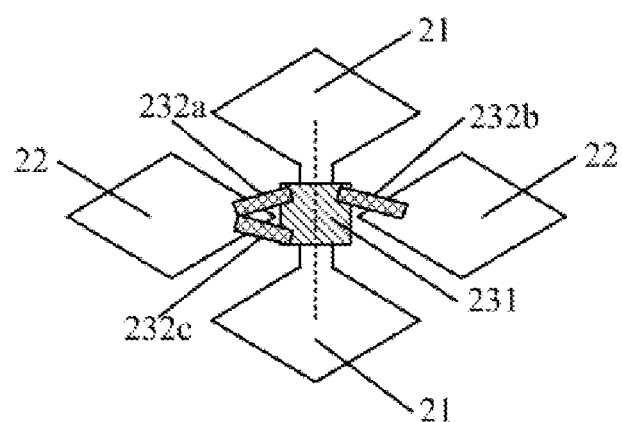
FIG. 5a is a fourth schematic structural view of a touch panel provided by the present scheme.
Figure 5B:
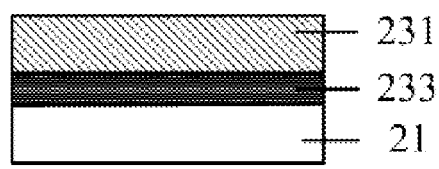
FIG. 5b is a cross-sectional structural view of a touch panel provided by the present scheme.

Based on the foregoing structure, the present scheme provides another touch panel. The connection portion 231 is insulated from and overlapped with the first touch electrode pattern. The specific structure is shown in FIG. 5a, wherein the connection portion 231 is overlapped on the first touch electrode pattern and insulated from the first touch electrode pattern. The structure of FIG. 5a includes three metal bridges, and inclined angles of the three metal bridges with respect to the second direction may be different, that is, each of the metal bridges is arranged along different preset directions. Preferably, the cross-sectional view taken along the broken line in FIG. 5a is shown in FIG. 5b. An insulation layer 233 may be arranged between the connection portion 231 and the first touch electrode pattern, and the connection portion 231 and the first touch electrode pattern can be effectively separated by the insulation layer 233, thereby ensuring that the second touch electrode pattern is insulated from the first touch electrode pattern, and avoiding crosstalk or short circuit. In addition, the connection portion 231 can be used to be overlapped with the metal bridges 232a, 232b, and 232c. There may be a plurality of metal bridges, and angles of the plurality of metal bridges with respect to the second direction can be the same or different.

Figure 6:
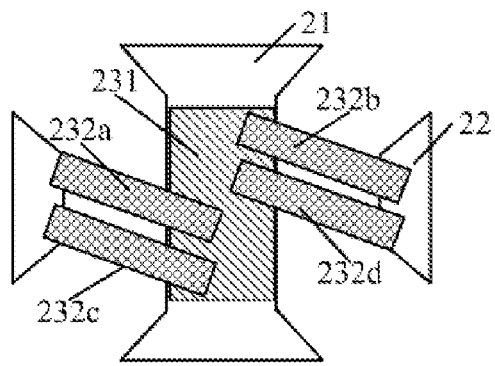
FIG. 6 is a fifth schematic structural view of a touch panel provided by the present scheme.

As shown in FIG. 6, each of the bridge units includes four metal bridges, wherein two metal bridges 232a, 232c are arranged at one side of the connection portion 231, and the other two metal bridges 232b, 232d are arranged at the other side of the connection portion 231. In the present scheme, taking the connection portion 231 overlapped on the first touch electrode pattern 21 for example, in the drawings, two metal bridges 232a, 232c are arranged on the left side of the connection portion 231 and two metal bridges 232b, 232d are arranged on the right side of the connection portion 231, the inclined angles of the four metal bridges in the drawing with respect to the second direction may be the same or different, and a length or a width of different metal bridges may also be different. With the structure, when the touch panel bends, if the metal bridge 232a at the upper left position is broken under the stress, signal transmission between the second touch unit and the connection portion 231 at the left side can be ensured by the metal bridge 232c at the lower left position, thereby ensuring the overall touch performance of the touch panel.

In addition, in the present scheme, the metal bridge is arranged at a certain angle with respect to the second direction. When the touch panel bends under the stress, the bending line can be effectively extended, thereby dispersing and releasing the stress to the surroundings, and reducing the occurrence of breakage of the metal bridge after bending under the stress.

In addition, based on the above structure, the present scheme further provides a preferred touch panel structure, and the metal bridges at both sides of the connection portion are centro-symmetrically arranged. With reference to FIG. 6, the four metal bridges at the left side and the right side of the connection portion 231 are parallel to each other, and the bridge unit is a centro-symmetrical structure as a whole. The inclined angle of each metal bridge with respect to the second direction is uniform which can be 45°. In addition, with reference to FIG. 7, the extending direction of the metal bridge 232a at the upper left position of the connection portion 231 is the same as the inclined direction of the metal bridge 232d at the lower right position. And the inclined direction of the metal bridge 232c at the lower left position is in coincidence with the inclined direction of the metal bridge 232b at the upper right position, and the bridge unit is a centro-symmetrical structure as a whole. In addition, the bridge unit having the centro-symmetrical structure is not limited to the two types shown in FIG. 6 and FIG. 7. The connection portion of the bridge unit may also be located in the hollow-out region of the first touch electrode pattern. And the metal wires may also be two or more. There may be no connection portion in the bridge unit and only the metal bridge is included.

Figure 7:
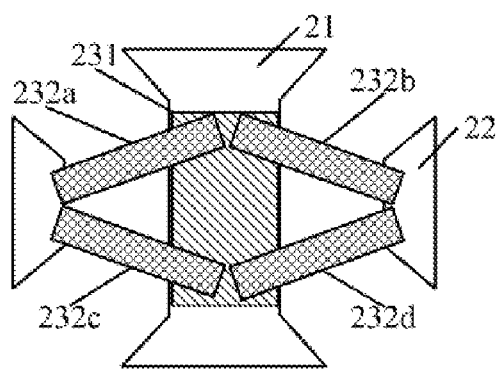
FIG. 7 is a sixth schematic structural view of a touch panel provided by the present scheme.

In the structure of the bridge unit shown in FIG. 6 and FIG. 7, the stress can be more uniformly dispersed when bending under the external force, and the bending line can be effectively extended, so that the stress can be dispersed and released to the surroundings, thereby reducing the probability of the breakage of the metal bridge after bending under the stress.

Figure 8:
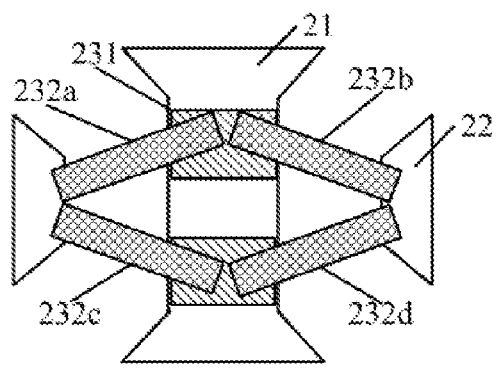
FIG. 8 is a seventh schematic structural view of a touch panel provided by the present scheme.

Moreover, the connection portion 231 shown in FIG. 7 may be rectangular as shown in the drawing and completely cover the connection unit in the first touch electrode pattern, or may be adjusted according to the position and quantity of the metal bridge. For example, as shown in FIG. 8, the connection portion 231 includes upper and lower portions which are used to be in communication with the left metal bridges 232a and the right metal bridge 232b, 232c and 232d, respectively. This structure can reduce the area of the connection portion 231, thereby avoiding unnecessary waste.

Figure 9A:
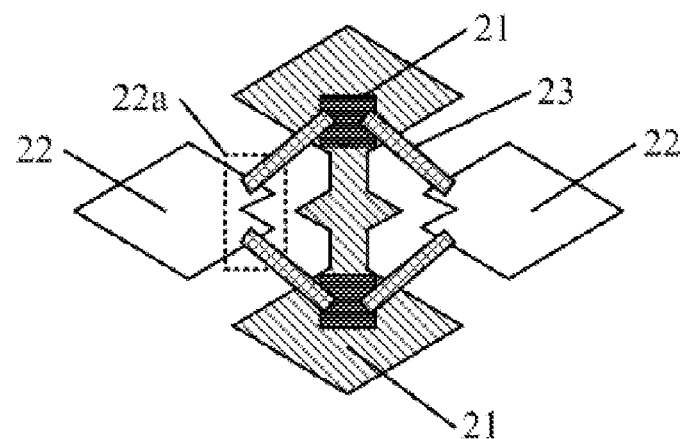
FIG. 9a is an eighth schematic structural view of a touch panel provided by the present scheme.

Based on the structure provided by the above exemplary embodiment, an exemplary embodiment of the present scheme further provides a touch panel. With reference to FIG. 9a, the two adjacent second touch units 22 corresponding to any one of the bridge units 23 each have a concave-convex structure 22a at a spaced channel, and the two second touch units 22 are connected by the bridge unit via the shortest distance.

In FIG. 9a, the concave-convex structure of the second touch unit 22 is triangular, as specifically shown in the curved frame indicated by 22a in FIG. 9a. Similarly, the concave-convex structure may also be rectangular, as shown by the dashed frame indicated by 22a in FIG. 9b. In addition, the concave-convex structure may be other patterns such as a trapezoid, a semicircle, and the like. In the above structure, since the second touch unit 22 has the concave-convex structure and the two adjacent second touch units 22 are connected by the bridge unit 23 via the shortest distance, the length of the bridge unit 23 is relatively short. Since the metal bridge in the bridge unit is made of metal material, and the touch panel is often overlapped with the display panel in the electronic device, shortening the length of the metal bridge unit 23 in the present scheme may avoid reflecting light of metals present on the touch panel as much as possible, thereby avoiding the influence on the display performance. In addition, a shorter metal bridge is less prone to breaking than a longer metal bridge. Therefore, shortening the length of the metal bridge may further improve the durability of the entire touch panel. Especially for a flexible touch panel, the shorter metal bridge may further improve the ability to resist bending of the touch panel.

Based on the structure provided by the above exemplary embodiment, the present scheme further provides a touch panel. With reference to FIG. 9a, the connection unit of the first touch electrode pattern has a concave-convex structure 21a matching with the concave-convex structure 22a of the second touch electrode pattern.

Figure 9B:
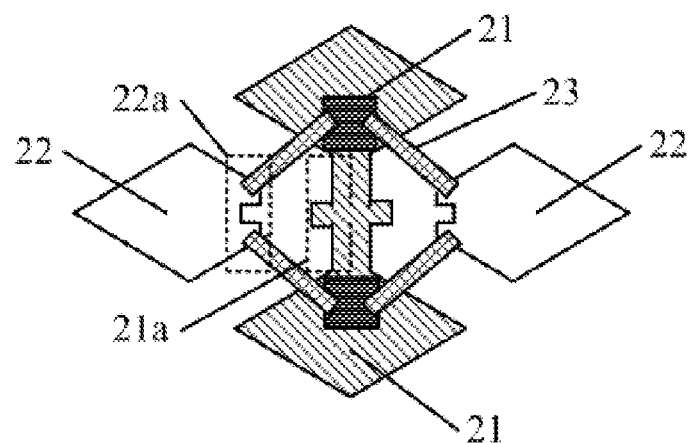
FIG. 9b is a ninth schematic structural view of a touch panel provided by the present scheme.

The connection unit of the first touch electrode pattern in FIG. 9a and FIG. 9b is used to perform turn-on touch signal between the two adjacent second touch units 22. When the second touch unit 22 has the concave-convex structure 22a, in order to ensure the turn-on touch signal between the two adjacent second touch units 22 and avoid too narrow width for touch signal transmission, the connection unit of the first touch electrode pattern in the present scheme has a shape matching with the concave-convex structure 22a of the second touch unit, thereby effectively avoiding too narrow channel for touch signal transmission, reducing the overall resistance of the touch panel, and improving the touch sensitivity of the entire touch panel.

Exemplary Embodiment 3

Based on the above exemplary embodiments, the disclosure further provides a touch display device comprising any one of the above touch panels. The touch display device can be applied to an electronic device with a touch display function. The touch display device provided by the present exemplary embodiment can alleviate the problem of touch failure caused by the breakage of the bridge unit when bending under the external force, thereby improving the overall antistatic capability of the touch display device and prolonging the service life of the device. Moreover the scheme can shorten the length of the metal bridge between the second touch units to some extent and reduce the reflecting light defect of metals on the surface of the touch panel.

In addition, the touch display device may be any products or components having the display function, such as a mobile phone, a tablet computer, a television, a display, a notebook computer, a digital photo frame, a navigator, and a smart wearable device. Other components indispensable to the touch display device should be understood by a person skilled in the art, which are not described in detail herein, nor should be construed as a limitation to the disclosure.

The above description is only exemplary embodiments of the disclosure and is not intended to limit the disclosure. For a person skilled in the art, the disclosure may have various modifications and changes. Any modification, equivalent replacement, and improvement made within the spirit and principle of the disclosure should fall into the scope of the claims of the disclosure.

What is claimed is:

1. A display panel, comprising:
a plurality of first touch electrode patterns arranged along a first direction, the first touch electrode patterns comprising a plurality of first touch units and a connection unit connecting two adjacent first touch units;
a plurality of second touch electrode patterns arranged along a second direction and insulated from and intersected with the first touch electrode patterns, the second touch electrode patterns comprising a plurality of independent second touch units and at least one bridge unit connecting two adjacent second touch units, the at least one bridge unit being arranged along a preset direction, and an intersection angle between the preset direction and the second direction being between 0° and 90°,
wherein the two adjacent second touch units corresponding to any one of the bridge units have a concave-convex structure at a spaced channel between the two adjacent second touch units, respectively, and the two second touch units are connected by the bridge unit,
wherein the two adjacent second touch units have the concave-convex structure forming at least one notch portion on the two adjacent second touch units,
wherein the at least one bridge unit connects the two adjacent second touch units along the preset direction avoiding the at least one notch portion,
wherein the two adjacent first touch units are connected via the connection unit with a predetermined distance, the connection unit has an elongated portion of a length as same as the predetermined distance, and the predetermined distance is greater than a width of the concave-convex structure on the two adjacent second touch units.

2. The touch panel according to claim 1, wherein the at least one bridge unit comprises at least two metal bridges and a connection portion connecting the at least two metal bridges, and the at least two metal bridges are arranged along the preset direction.

3. The touch panel according to claim 2, wherein in the at least two metal bridges, each metal bridge is arranged along different preset directions.

4. The touch panel according to claim 2, wherein each bridge unit comprises four metal bridges, and two metal bridges are arranged at one side of the connection portion and the other two metal bridges are arranged at the other side of the connection portion.

5. The touch panel according to claim 4, wherein the metal bridges located at both sides of the connection portion are centro-symmetrically arranged.

6. The touch panel according to claim 4, wherein the connection portion comprises an upper portion and a lower portion, left and right metal bridges are turned-on by the upper and lower portions of the connection portion.

7. The touch panel according to claim 4, wherein the two metal bridges arranged at the one side of the connection portion are parallel to each other, and the other two metal bridges arranged at the other side of the connection portion are parallel to each other.

8. The touch panel according to claim 4, wherein
an upper metal bridge of two metal bridges arranged at left side of the connection portion and a lower metal bridge of two metal bridges arranged at right side of the connection portion are parallel to each other, and
an upper metal bridge of the two metal bridges arranged at the right side of the connection portion and a lower metal bridge of the two metal bridges arranged at the left side of the connection portion are parallel to each other.

9. The touch panel according to claim 8, wherein
the connection portion comprises an upper portion and a lower portion,
the upper metal bridge of the two metal bridges arranged at the left side of the connection portion and the upper metal bridge of the two metal bridges arranged at the right side of the connection portion are turned-on by the upper portion of the connection portion, the lower metal bridge of the two metal bridges arranged at the left side of the connection portion and the lower metal bridge of the two metal bridges arranged at the right side of the connection portion are turned-on by the lower portion of the connection portion.

10. The touch panel according to claim 2, wherein the first touch electrode pattern is provided with a hollowed-out region, and the connection portion is insulatively embedded in the hollowed-out region.

11. The touch panel according to claim 2, wherein the connection portion is insulated from and overlapped with the first touch electrode pattern.

12. The touch panel according to claim 11, wherein the connection portion and the first touch electrode pattern have an insulation layer provided therebetween.

13. The touch panel according to claim 2, wherein the connection portion is rectangular and completely covers the connection unit of the first touch electrode pattern.

14. The touch panel according to claim 2, wherein the connection portion covers only the elongated portion of the connection unit.

15. The touch panel according to claim 14, wherein the connection portion comprises an upper portion and a lower portion, the upper and lower portions of the connection portion are provided within the elongated portion of the connection unit.

16. The touch panel according to claim 15, wherein the upper and lower portions are respectively provided at either end-portion of the elongated portion.

17. The touch panel according to claim 1, wherein the concave-convex structure is triangular or rectangular or trapezoidal or semi-circular.

18. The touch panel according to claim 1, wherein the connection unit of the first touch electrode pattern has a concave-convex structure matching with the concave-convex structure of the second touch electrode pattern.

19. The touch panel according to claim 1, wherein the at least one bridge unit comprises at least three metal bridges and a connection portion connecting the at least three metal bridges, and the at least three metal bridges are arranged along different preset directions.

20. A touch display device, comprising a display panel and a touch panel, the touch panel comprising:

a plurality of first touch electrode patterns arranged along a first direction, the first touch electrode patterns comprising a plurality of first touch units and a connection unit connecting two adjacent first touch units;

a plurality of second touch electrode patterns arranged along a second direction and insulated from and intersected with the first touch electrode patterns, the second touch electrode patterns comprising a plurality of independent second touch units and at least one bridge unit connecting two adjacent second touch units, the at least one bridge unit being arranged along a preset direction, and an intersection angle between the preset direction and the second direction being between 0° and 90°, wherein the two adjacent second touch units corresponding to any one of the bridge units have a concave-convex structure at a spaced channel between the two adjacent second touch units, respectively, and the two second touch units are connected by the bridge unit, wherein the two adjacent second touch units have the concave-convex structure forming at least one notch portion on the two adjacent second touch units, wherein the at least one bridge unit connects the two adjacent second touch units along the preset direction avoiding the at least one notch portion, wherein the two adjacent first touch units are connected via the connection unit with a predetermined distance, the connection unit has an elongated portion of a length as same as the predetermined distance, and the predetermined distance is greater than a width of the concave-convex structure on the two adjacent second touch units.

* * * * *